United States Patent [19]

Sato et al.

[11] 4,443,420
[45] Apr. 17, 1984

[54] PROCESS FOR PRODUCING CUBIC SYSTEM BORON NITRIDE

[75] Inventors: Tadao Sato; Toshihiko Ishii, both of Sakura; Nobuo Setaka, Nagareyama, all of Japan

[73] Assignee: National Institute for Researches in Inorganic Materials, Niihari, Japan

[21] Appl. No.: 359,100

[22] Filed: Mar. 17, 1982

[30] Foreign Application Priority Data

Oct. 26, 1981 [JP] Japan .................................. 56-171250

[51] Int. Cl.³ .......................................... C01B 21/06
[52] U.S. Cl. .................................................. 423/290
[58] Field of Search ........................................ 423/290

[56] References Cited

U.S. PATENT DOCUMENTS 3,876,751  4/1975  Alexeevsky ........................ 423/290
4,289,503  9/1981  Corrigan .

FOREIGN PATENT DOCUMENTS 50-31120  10/1975  Japan .................................. 423/290

OTHER PUBLICATIONS

Ishii et al., "Growth of Whiskers of Hexagonal Boron Nitride", *Journal of Crystal Growth,* 52, pp. 285–289, (1981).
Saito et al., "Proceedings", VII, Int. High Press. Sci. & Tech., Le Creusot, France, Aug. 1979.

*Primary Examiner*—Edward J. Meros
*Assistant Examiner*—Jackson Leeds
*Attorney, Agent, or Firm*—Oblon, Fisher, Spivak, McClelland & Maier

[57] ABSTRACT

Cubic system boron nitride from rhombohedral system boron nitride is produced by a shock wave compression method. The process comprises applying a thermodynamically stable pressure to rhombohedral system boron nitride to convert it to cubic system boron nitride.

8 Claims, 9 Drawing Figures

PROCESS FOR PRODUCING CUBIC SYSTEM BORON NITRIDE

BACKGROUND OF THE INVENTION

1. Field of the Invention

The present invention relates to a process for producing a cubic system boron nitride from rhombohedral boron nitride.

2. Description of the Prior Art

Cubic system boron nitride has hardness comparable to diamond, and it is even superior to diamond in its properties as a grinding material for steels.

Heretofore, it has been common to use powder of hexagonal system boron nitride or its sintered product as the starting material for the production of a high pressure boron nitride. In a method for converting hexagonal system boron nitride to a high pressure boron nitride by subjecting the hexagonal system boron nitride to static high pressure or high pressure of a shock wave, the product thereby obtainable is composed mainly of wurtzite structure boron nitride with inclusion of a small amount of cubic boron nitride. The wurtzite structure boron nitride is inferior to cubic system boron nitride in its sintering property and hardness, and sharp corners are hardly obtainable by cleavage. Thus, it is inferior in its properties as grinding material.

In order to increase the yield of the cubic system boron nitride, it has been attempted to subject the hexagonal system boron nitride to a high temperature of at least 2,000°K. under static high pressure, or to repeat the shock compression several times.

However, such methods require expensive apparatus and involve cumbersome operations, and yet the yield of the cubic system boron nitride is low. Further, it is also known to subject the hexagonal system boron nitride to a high temperature under high pressure in the presence of a catalyst. In this method, coarse cubic system boron nitride is obtainable. However, it is necessary to maintain the reaction conditions at a high temperature under high pressure for a long period of time, and accordingly, expensive equipments and operations are required.

SUMMARY OF THE INVENTION

Accordingly, it is an object of the present invention to provide a process whereby cubic system boron nitride can be obtained in good yield and inexpensively without involving the above-mentioned disadvantages.

Paying a particular attention to a relatively simple crystal structural relationship between rhombohedral system boron nitride and cubic system boron nitride, the present inventors have found that rhombohedral system boron nitride can readily be converted to cubic system boron nitride by subjecting the former to high pressure, and the present invention has been accomplished on the basis of this discovery.

The present invention provides a process for producing cubic system boron nitride, which comprises applying a thermodynamically stable pressure to rhombohedral system boron nitride to convert the rhombohedral system boron nitride to cubic system boron nitride.

BRIEF DESCRIPTION OF THE DRAWINGS

FIGS. 3, 4 and 5 show an embodiment of an apparatus to be used for carrying out the process of the present invention;

In FIG. 8, 42.6° and 45.6° indicate X-ray diffraction lines of rhombohedral system boron nitride, and 41.6° and 43.9° indicate X-ray diffraction lines of hexagonal system boron nitride. In FIG. 9 43.3° and 50.4° indicate X-ray diffraction lines of cubic boron nitride and 40.8° and 42.7° indicate X-ray diffraction lines of wurtzite structure boron nitride.

DETAILED DESCRIPTION OF THE PREFERRED EMBODIMENTS

Figure 1:
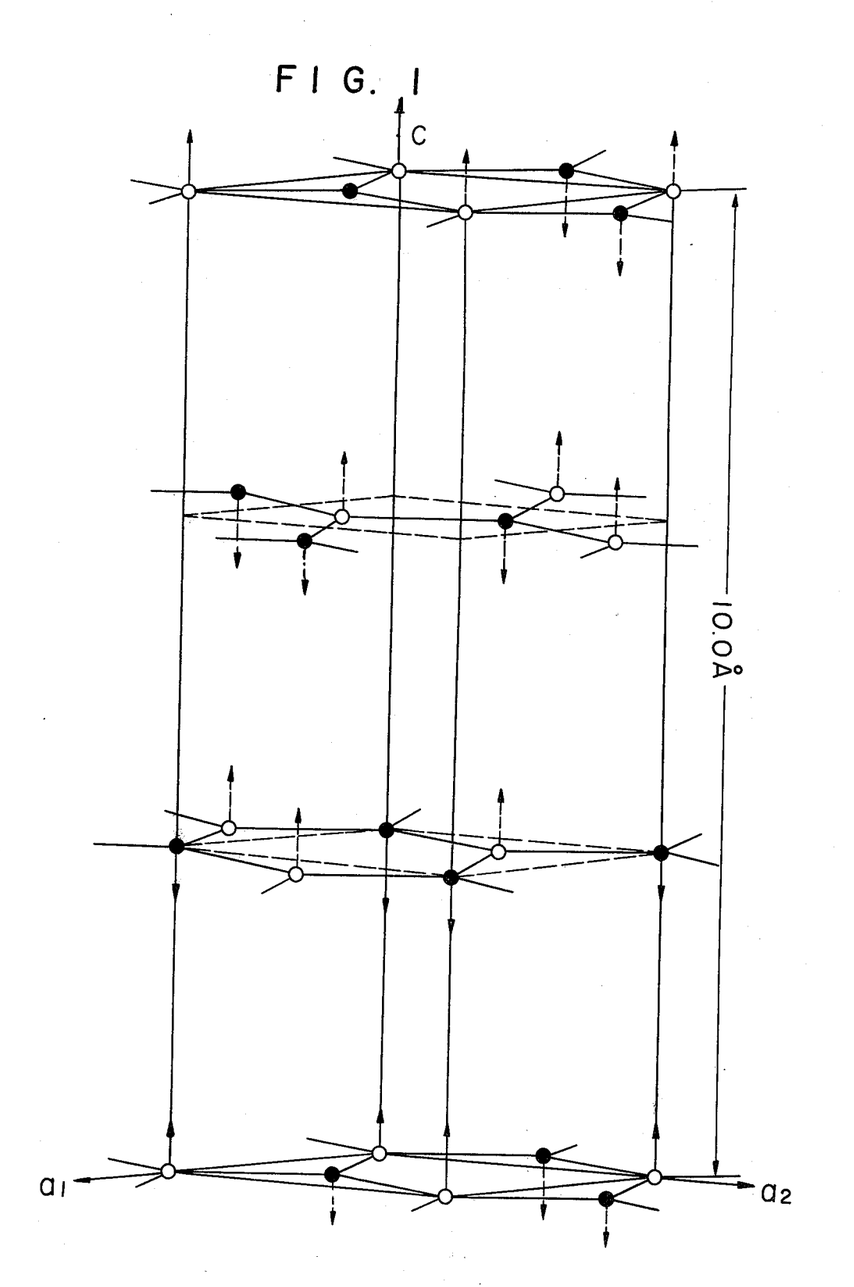
FIG. 1 shows a crystal structure of rhombohedral system boron nitride.
Figure 2:
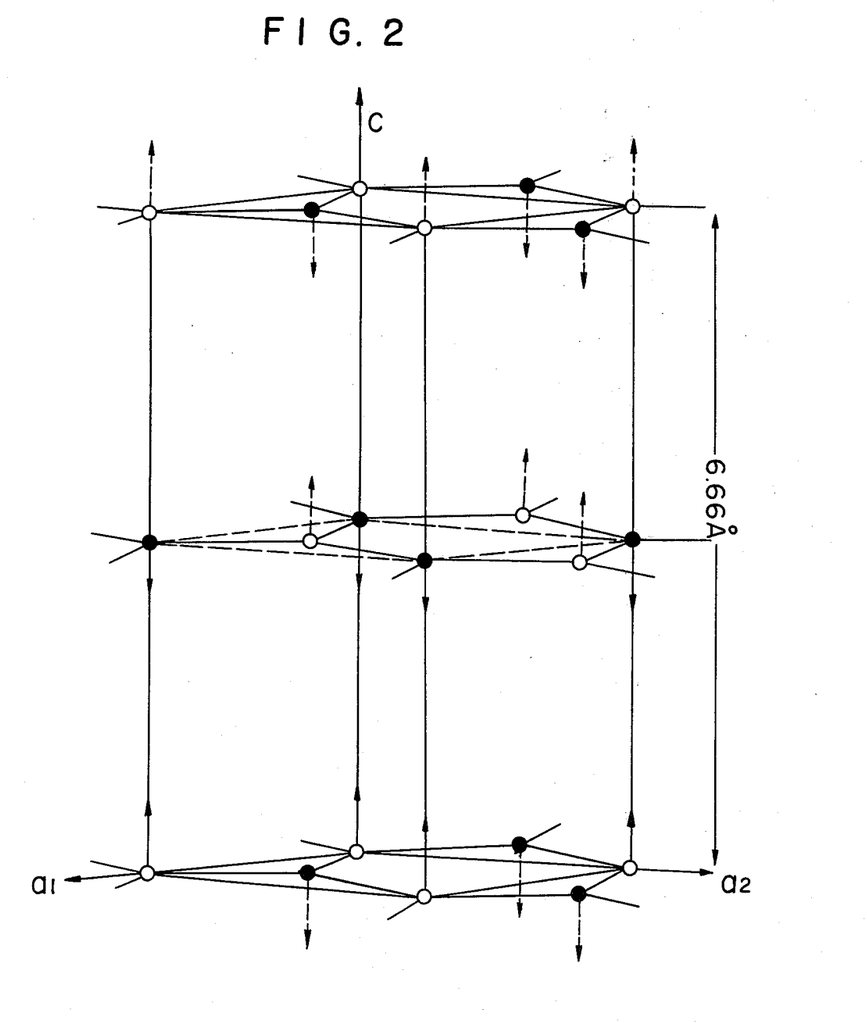
FIG. 2 shows a crystal structure of hexagonal system boron nitride.

As shown in FIG. 1, rhombohedral system boron nitride has a layered structure having three layer repeating units. Whereas hexagonal system boron nitride has a layered structure having two layer repeating units as shown in FIG. 2. However, as viewed from a (///) direction, the cubic system boron has a structure having three layer repeating units similar to the rhombohedral system boron nitride. In FIGS. 1 and 2, ○ represents a boron atom, ● represents a nitrogen atom, and ⊢ represents a unit lattice. The rhombohedral system boron nitride can be converted to cubic system boron nitride by compressing it to reduce the distance between the layers of the hexagonal net planes and to shift the constituent atoms in a direction shown by the arrow →. This conversion is a so-called non-diffusion type conversion whereby the conversion takes place merely by changes of the bond length and the bond angle without involving mutual positional replacement among the atoms constituting boron nitride.

In such a non-diffusion type conversion, hexagonal system boron nitride having a layered structure having two layer repeating units tends to be converted to wurtzite structure boron nitride which likewise has a layered structure having two layer repeating units. In order to convert hexagonal system boron nitride to cubic system boron nitride, it is necessary to destroy the layered structure having two layer repeating units and change it to a layered structure having three layer repeating units. Such a method and drawbacks involved therein are as mentioned above.

The present invention is concerned with a process for converting rhombohedral system boron nitride to cubic system boron nitride by means of the non-diffusion type conversion, whereby cubic system boron nitride can be produced in good yield in a simple operation as compared with the conventional method in which hexagonal system boron nitride is used as the starting material. Further, it is thereby possible to reduce the production costs.

The process of the present invention comprises applying a thermodynamically stable pressure to rhombohedral boron nitride. The thermodynamically stable pressure is given, for instance, by propelling a flyer plate or projectile plate by an explosion wave generated by detonation of an explosive, thereby to collide the flyer plate to a sample vessel to produce a strong shock wave. When the shock wave pressure is imparted to the starting material, the rhombohedral system boron nitride is converted to cubic system boron nitride After the application of the shock wave pressure, if a temperature higher than 1500° C. remains in the sample, the formed cubic system tends to reconvert to a low pressure boron nitride, thus leading to a decrease in the yield of cubic system boron nitride. Accordingly, it is desirable to disperse the heat generated by the shock wave compression out of the system, thereby to lower the residual temperature. As such a method, metal powder such as copper powder may be mixed with and dispersed in rhombohedral system boron nitride powder, and the mixture may be compessed to form a compact which can be used as the starting material. The reconversion can thereby be prevented.

The heat generation by the shock wave compression is dependent on the pressure of the shock wave, the composition of the material to receive the shock wave pressure and the porosity of the compact.

The shock wave compression pressure is preferably from 100 to 1500 k bar. If the pressure is lower than 100 k bar, cubic system boron nitride will not adequately be formed. On the other hand, if the pressure exceeds 1500 k bar, the temperature will be raised too much, whereby the yield tends to decrease. As the shock compression method, it is preferred that the shock wave compressing pressure is generated by a collision of a flyer plate to a sample vessel by detonation of an explosive. However, other shock compression methods may be used.

The starting material rhombohedral system boron nitride may be the one produced by a conventional method. However, it is desirable that the rhombohedral system boron nitride is as pure as possible and has good crystallinity. Its particle size is at most 100 microns, preferably at most 20 microns, especially at most 10 microns. If the particle size is great, the transmission of the pressure and the heat dispersion tend to be poor, thus leading to a decrease in the yield.

As the metal powder to be mixed with the rhombohedral system boron nitride to facilitate the heat dispersion, there may be mentioned metal powders having good heat dispersing properties such as copper powder and iron powder. Copper powder is particularly preferred. The particle size is at most 200 microns, preferably at most 50 microns. The metal powder is mixed preferably in an amount of at least 80% by weight. If the mixing ratio of the metal powder is small, the cooling effect will be decreased, and the tendency for reconversion of the formed cubic boron nitride will be increased. A particularly preferred range is at least 95%.

The porosity of the compact of the above-mentioned mixture is preferably at least 30%. By reducing the void spaces in the compacted powder, the temperature raise can be prevented and at the same time, the transmission of the pressure can be improved. If the porosity is high, the heat generation tends to be great and the reconversion of the formed product is likely to take place.

The product obtained by the shock compression is treated with e.g. an aqueous nitric acid solution to dissolve the metal component, and then the cubic system boron nitride is separated from unconverted boron nitride by e.g. a heavy liquid separation method. The product thereby obtained was confirmed to be cubic system boron nitride by a method such as X-ray diffraction, electron diffraction or electron microanalyzer.

According to the process of the present invention, it is possible to produce cubic system boron nitride in good yield and in a simple operation as compared with a conventional shock compression method wherein hexagonal system boron nitride is used as the starting material. Further, it is possible to use the same compression means as used in the conventional method. Accordingly, the process of the present invention is advantageous also from the viewpoint of the production costs.

Now, Examples of the present invention will be described with reference to the drawings.

Figure 3:
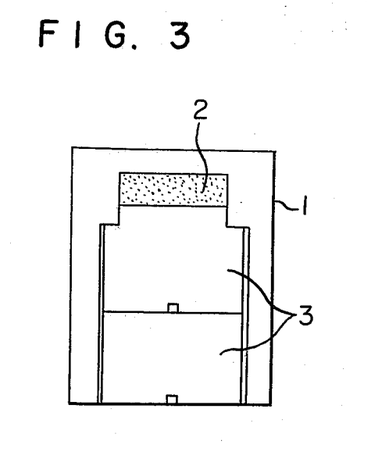
FIG. 3 is a vertical cross sectional view of a capsule.
Figure 4:
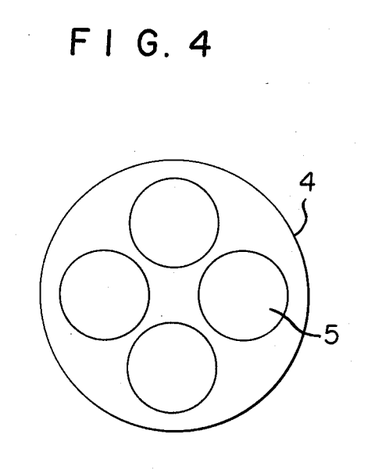
FIG. 4 is a plan view of a holder for the capsule.
Figure 5:
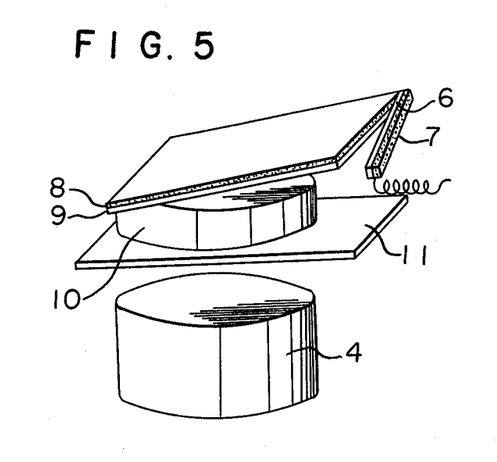
FIG. 5 is a schematic view illustrating the manner of propelling a flyer plate by detonation of an explosive.

FIGS. 3, 4 and 5 illustrate an embodiment of an apparatus to be used for carrying out the process of the present invention. FIG. 3 is a vertical cross section of a capsule, FIG. 4 is a plan view of a holder for the capsule, and FIG. 5 is a schematic view illustrating the manner of propelling a flyer plate by detonation of an explosive.

EXAMPLE 1

Figure 6:
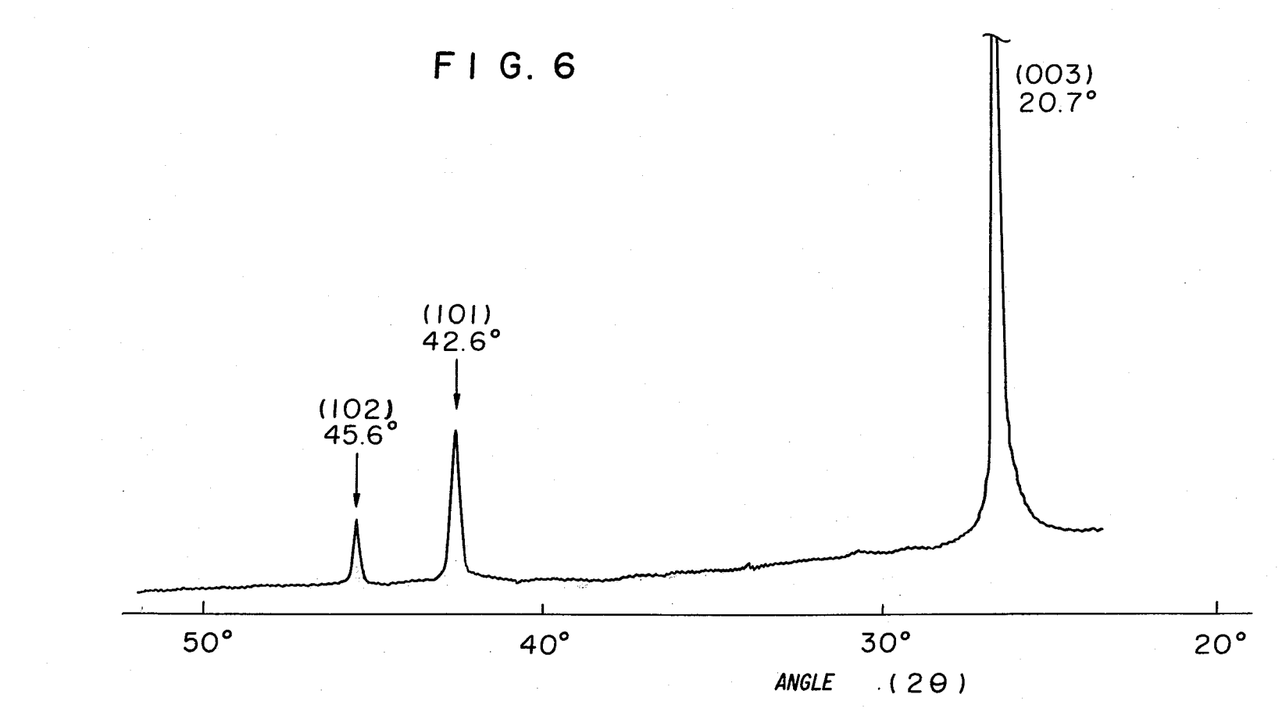
FIGS. 6, 7, 8 and 9 are X-ray diffraction diagrams, by a copper K$\alpha$ ray, of the starting materials used in the Examples and the compressed products.

To 1% by weight of rhombohedral system boron nitride powder composed of coarescences of whisker-like crystals having a diameter of about 1 micron and showing X-ray diffraction as shown in FIG. 6, 99% by weight of copper powder having a particle size of about 50 microns was mixed. The powder mixture 2 was packed in a stainless steel capsule 1 and compressed by pressing to form a compact having a porosity of 20%, and further screw-fastened by screw members 3.

Then, the capsules 1 were placed in capsule-receiving holes 5 of an iron holder 4. A metal rod 6 was propelled by detonation of an initiating explosive made of the metal rod 6 coated with an explosive 7 to hit an explosive 8, whereupon the explosive 8 was detonated to propel a flyer plate 9. The flyer plate 9 hit a main explosive 10 simultaneously, whereupon the entire main explosive exploded simultaneously to apply a plane shock wave to a metal plate 11. The metal plate 11 was propelled and collided to iron holder 4 and stainless capsule 1, whereby a shock wave was evenly imparted to the powder mixture 2 in the stainless capsule 1. The calculated value of this pressure was about 600 k bar.

Figure 7:
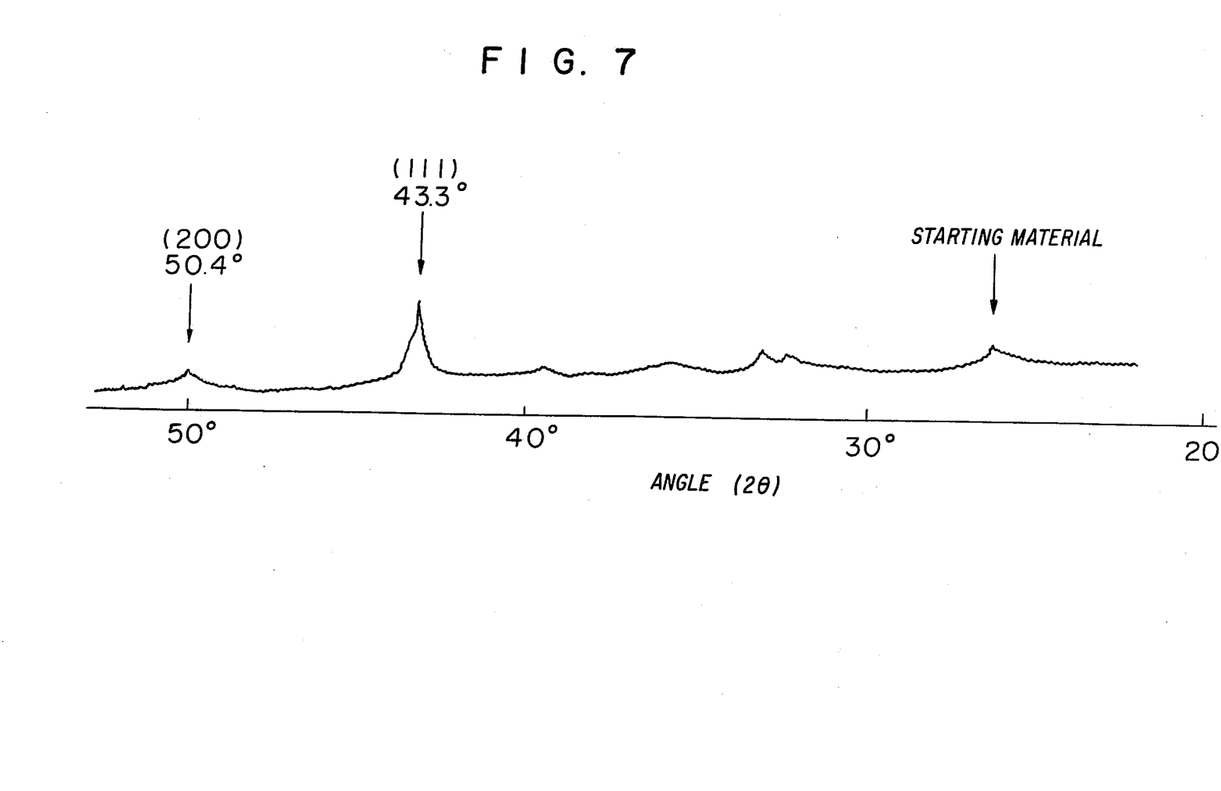

After the shock compression treatment, the sample was withdrawn and immersed in a 10% nitric acid aqueous solution, whereby copper was dissolved and the precipitates were collected. The main component of the precipitates was cubic system boron nitride and a small amount of unconverted boron nitride was contained therein, as shown in the X-ray diffraction diagram of FIG. 7. The contaminants were removed by a heavy liquid separation method, whereupon gray cubic system boron nitride with a high purity was obtained.

EXAMPLE 2

Figure 8:
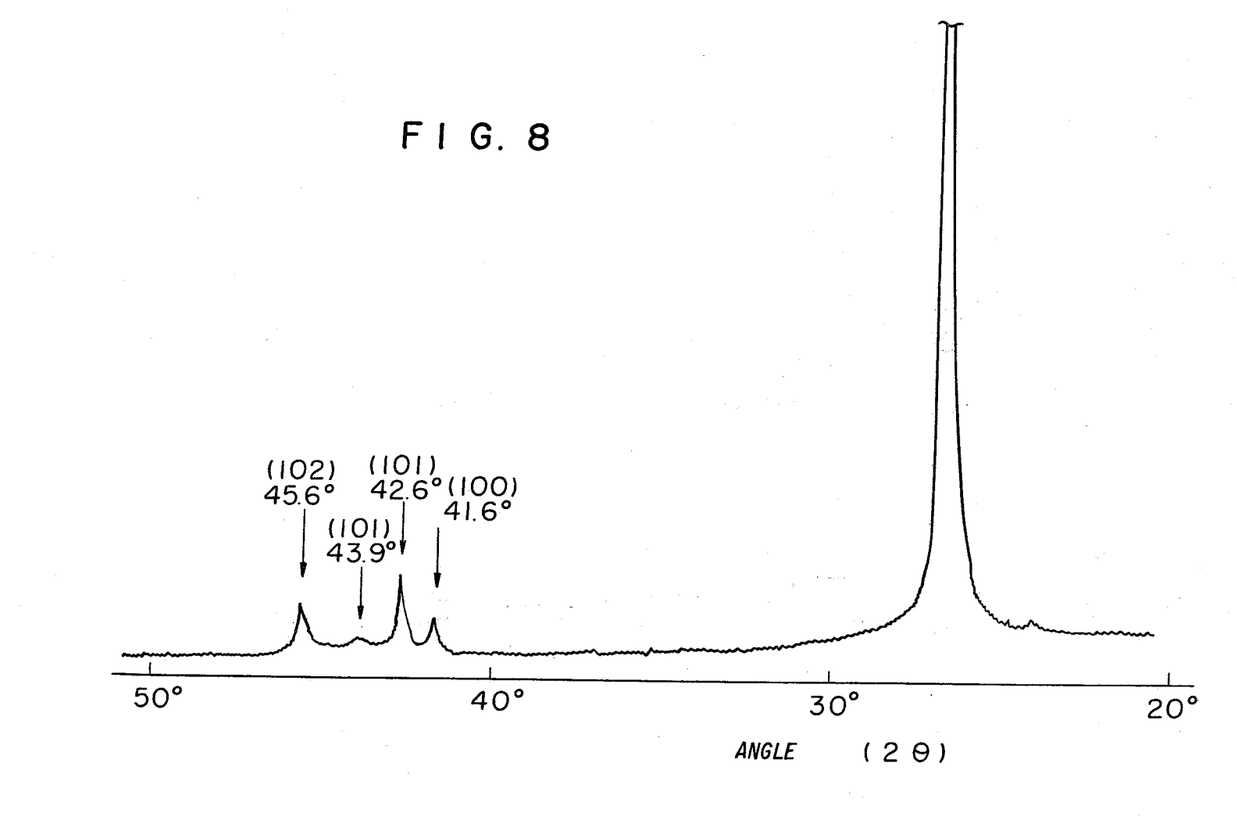
Figure 9:
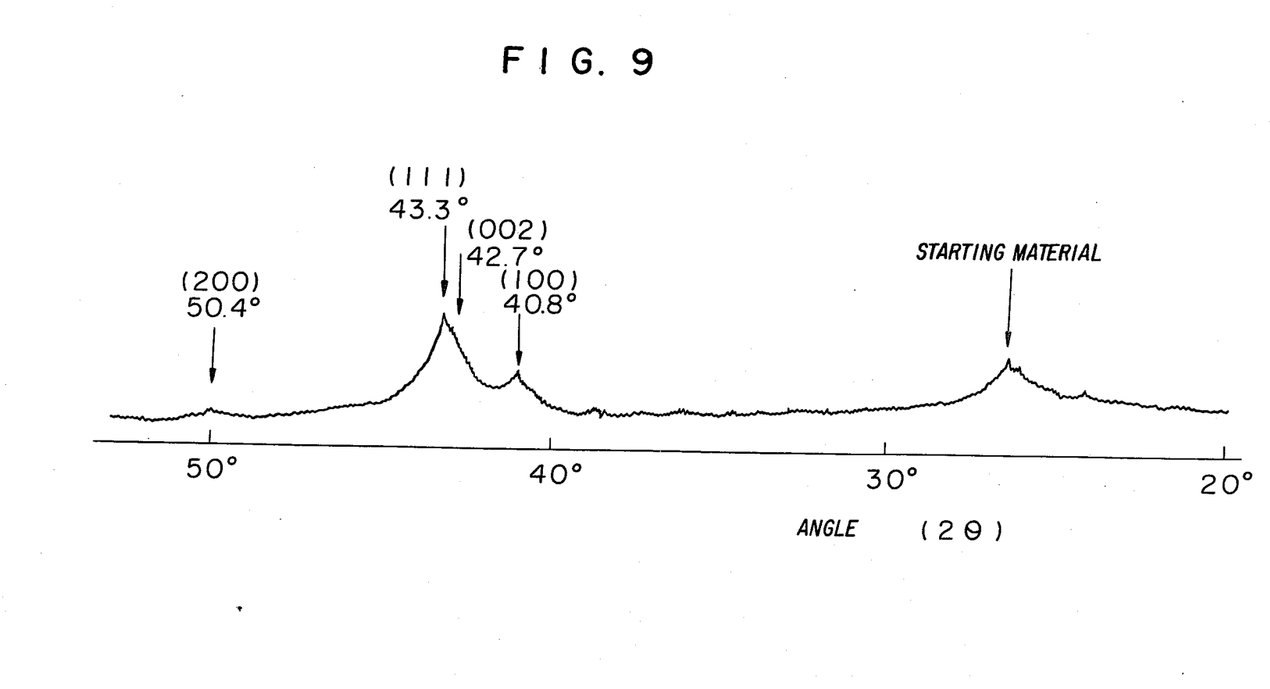

To 4% by weight of boron nitride powder obtained by synthesis with use of a molten mixture of boron oxide and potassium cyanide and containing 20% of hexagonal system boron nitride in addition to rhombohedral system boron nitride, as shown in FIG. 8, 96% by weight of copper powder was mixed, and the mixture was compacted to form a compact having a porosity of 20%. Then, in a manner similar to Example 1, shock compression was carried out to obtain a product. As shown in FIG. 9, the product contained cubic system boron nitride as the major component and about 10% of wurtzite structure boron nitride and unconverted boron nitride. The wurtzite structure boron nitride was the one derived from hexagonal system boron nitride present in the starting material by conversion thereof upon compression. The product was treated in a manner similar to Example 1, whereupon gray cubic system boron nitride with a high purity was obtained.

We claim:

1. A process for producing cubic system boron nitride, which comprises applying a thermodynamically stable shock wave compressing pressure of from about 100 to 1500 k bar to rhombohedral system boron nitride to convert the rhombohedral system boron nitride to cubic system boron nitride 2. The process according to claim 1 wherein the thermodynamically stable pressure is a shock wave compressing pressure generated by a collision of a flyer plate to a sample vessel by detonation of an explosive.

3. The process according to claim 1 wherein the rhombohedral system boron nitride is mixed and compacted in a powder form with metal powder, as the starting material.

4. The process according to claim 3 wherein the metal powder is copper powder or iron powder.

5. The process according to claim 1 wherein the rhombohedral system boron nitride is powder having a particle size of at most 100 microns.

6. The process according to claim 5 wherein the rhombohedral system boron nitride is mixed and compacted with metal powder selected from copper powder and iron powder and having a particle size of at most 200 microns.

7. The process according to claim 3, 4 or 6 wherein the metal powder is at least 80% by weight in the mixture.

8. The process according to claim 3, 4 or 6 wherein the porosity of the compact of the mixture is at most 30%.

* * * * *